(12) United States Patent
Marchisset

(10) Patent No.: US 11,143,229 B1
(45) Date of Patent: Oct. 12, 2021

(54) BIASING POSITIONING ELEMENT

(71) Applicant: Rodger Gabriel Marchisset, Alta Loma, CA (US)

(72) Inventor: Rodger Gabriel Marchisset, Alta Loma, CA (US)

( * ) Notice: Subject to any disclaimer, the term of this patent is extended or adjusted under 35 U.S.C. 154(b) by 0 days.

(21) Appl. No.: 17/097,905

(22) Filed: Nov. 13, 2020

(51) Int. Cl.
*F16B 19/02* (2006.01)
*F16B 21/12* (2006.01)

(52) U.S. Cl.
CPC ............ *F16B 19/02* (2013.01); *F16B 21/125* (2013.01)

(58) Field of Classification Search
CPC ........ F16B 19/02; F16B 21/124; F16B 21/12; F16B 21/125
USPC .................................. 411/351, 352
See application file for complete search history.

(56) References Cited

U.S. PATENT DOCUMENTS

| | | | | |
|---|---|---|---|---|
| 349,004 A * | 9/1886 | Renshaw et al. | ....... | F16B 19/02 278/65 |
| 365,761 A * | 6/1887 | Stroup | ..................... | B60D 1/02 278/65 |
| 406,828 A * | 7/1889 | Fietsch | ................... | B41F 27/04 101/385 |
| 926,568 A * | 6/1909 | Huey | .................... | F16B 41/002 411/352 |
| 1,651,318 A * | 11/1927 | Blass | ..................... | F16B 21/125 411/345 |
| 2,179,604 A * | 11/1939 | Tinnerman | ............ | F16B 21/086 248/239 |
| 4,828,442 A * | 5/1989 | Duran | ...................... | F16B 5/01 411/112 |
| 4,922,587 A * | 5/1990 | Pettit | ..................... | F16B 5/0642 24/293 |
| 5,724,756 A * | 3/1998 | Gale | ..................... | E02F 9/2841 37/455 |
| 9,512,598 B2 * | 12/2016 | Rol Corredor | ....... | E02F 9/2833 |

* cited by examiner

*Primary Examiner* — Flemming Saether
(74) *Attorney, Agent, or Firm* — Law Office of Austin Bonderer; Austin Bonderer

(57) ABSTRACT

The positioning pin has a pin body and a biasing element. The pin body defines a slit through which at least a portion of the biasing element is able to extend through. The pin body can be configured to be at least partially inserted into a working surface hole and help position an object. The biasing element has an engagement element that is able to bias the working object in a direction of the slit.

17 Claims, 5 Drawing Sheets

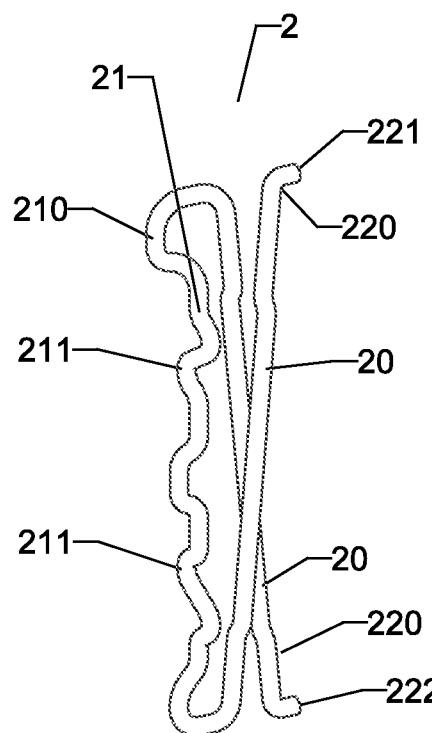
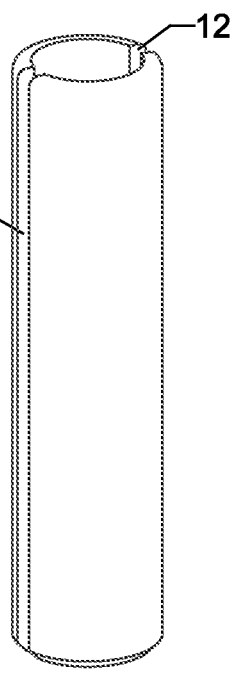
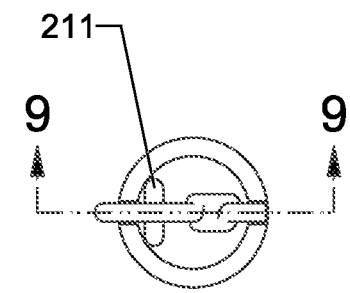
FIG. 8
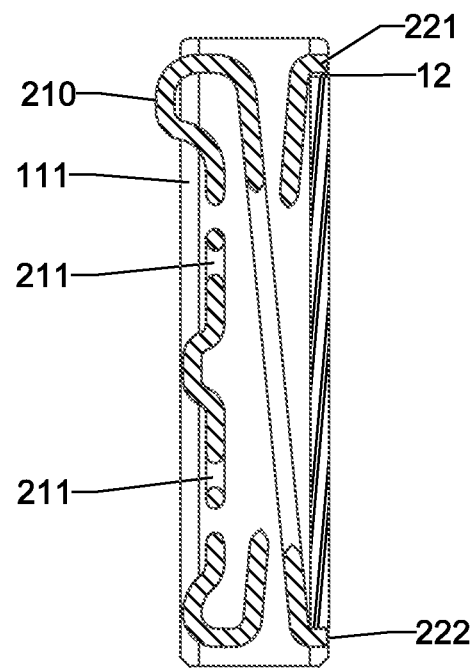
FIG. 7
FIG. 9

BIASING POSITIONING ELEMENT

FIELD

The subject matter herein generally relates to fixing members.

BACKGROUND

Often items have the need to be fixed in relation to a machining element. However the items are not always exact in their manufacture and tolerances must be accounted. This often requires repositioning of pins and other retaining elements for each item.

BRIEF DESCRIPTION OF THE DRAWINGS

Implementations of the present technology will now be described, by way of example only, with reference to the attached figures, wherein:

FIG. 7 shows an exploded view of an embodiment of a positioning member.

FIG. 8 shows a top view of an embodiment of a positioning member.

FIG. 9 shows a cross-section of the embodiment shown in FIG. 8.

DETAILED DESCRIPTION

Figure 1:
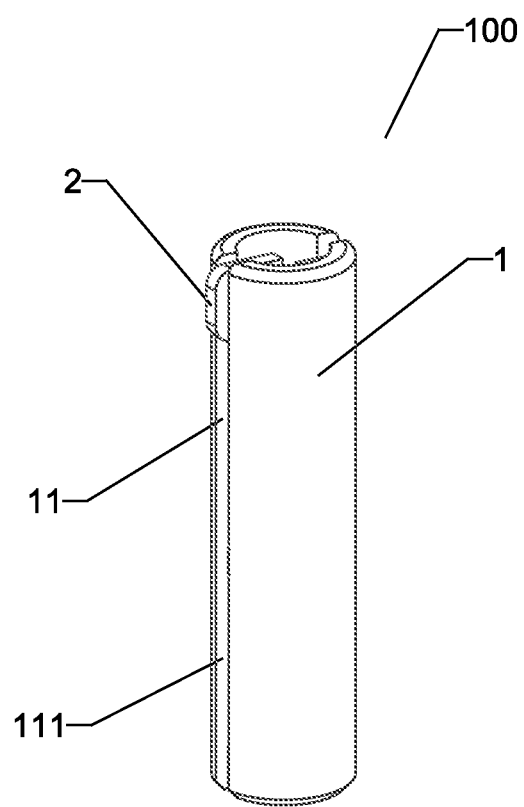
FIG. 1 shows an embodiment of the positioning member.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. The drawings are not necessarily to scale and the proportions of certain parts may be exaggerated to better illustrate details and features. The description is not to be considered as limiting the scope of the embodiments described herein. It should be noted that references to "an" or "one" embodiment in this disclosure are not necessarily to the same embodiment, and such references mean at least one.

Several definitions that apply throughout this disclosure will now be presented.

The term "coupled" is defined as connected, whether integral with, directly attached, or indirectly attached through intervening components, and is not necessarily limited to physical connections. The connection can be such that the objects are permanently connected or releasably connected. The term "outside" refers to a region that is beyond the outermost confines of a physical object. The term "inside" indicates that at least a portion of a region is partially contained within a boundary formed by the object. The term "substantially" is defined to be essentially conforming to the particular dimension, shape or other word that substantially modifies, such that the component need not be exact. For example, substantially cylindrical means that the object resembles a cylinder, but can have one or more deviations from a true cylinder. The term "comprising" means "including, but not necessarily limited to"; it specifically indicates open-ended inclusion or membership in a so-described combination, group, series, and the like.

The present disclosure is described in relation to a fixing block used in machining; however, the positioning member 100 can be used in any number of uses.

FIG. 1 illustrates an embodiment of the positioning member 100 comprising a pin body 1 and a biasing element 2. The pin body 1 defines one or more slits 11. The pin body 1 defines two or more slit walls 111 that define the one or more slits 11. The pin body 1 also comprises one or more retaining members 12. The retaining members 12 and the pin body 1 define a retaining orifice 121.

Figure 2:
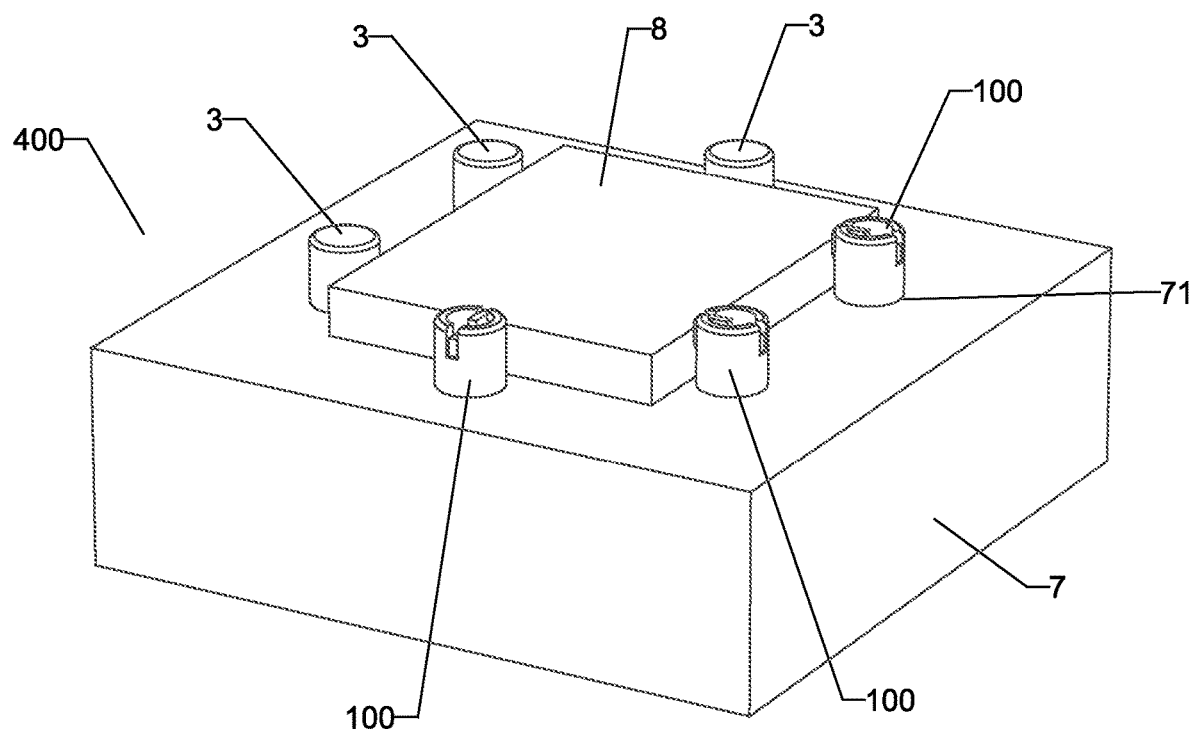
FIG. 2 shows embodiments of the positioning member in use on a working surface retaining an object.

FIG. 2 illustrates an embodiment of a fixture 400 comprising of three locating pins 3, three positioning members 100, and a working surface 7. The fixture 400 has an object 8 that is to be positioned before being acted upon by another object. In some embodiments, the working surface 7 is for a drill. In some embodiments, the working surface 7 is for a computer numerical control machine, 3-D printers, mills, cutters (e.g., laser, water).

Figure 3:
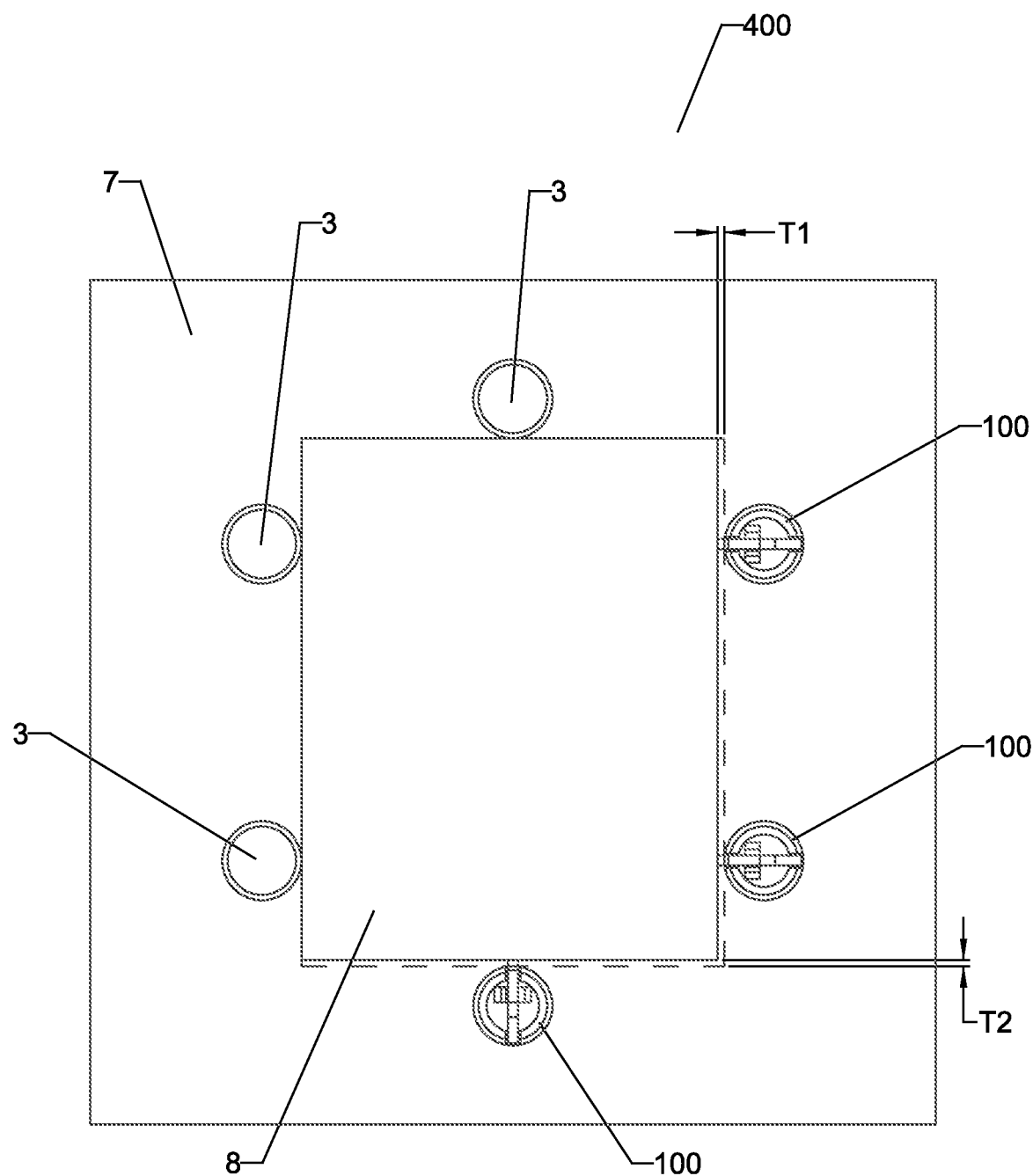
FIG. 3 shows embodiments of the positioning member in use on a working surface retaining an object from a top view.

FIG. 3 illustrates an embodiment of a fixture 400 comprising of three locating pins 3, three positioning members 100, and a working surface 7 as viewed from above. T1 and T2 that represented the dimensional variation in the object 8 that can be secured on the working surface 7. In some embodiments, the positioning members 100 are configured to be interested in a working surface 7.

Figure 4:
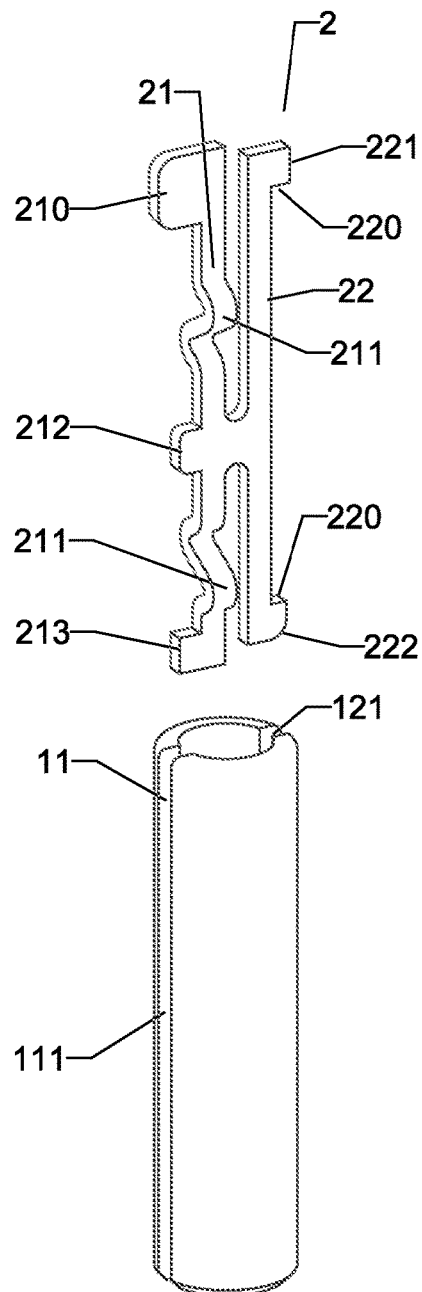
FIG. 4 shows an exploded view of an embodiment of a positioning member.

FIG. 4 shows an exploded view of a positioning member 100 comprising an embodiment of the biasing element 2. In some embodiments, the biasing element 2 comprises an engagement element 21 coupled to a retaining element 22. In some embodiments, the engagement element 21 and the retaining element 22 are integral, formed of a single piece of material, or a combination thereof.

In some embodiments, the engagement element 21 comprises one or more engagement section 210, one or more restraining sections 211, or a combination thereof. In some embodiments, the engagement element 21 comprises a mid-alignment section 212, a lower abutment 213, or a combination thereof. The engagement section 210 is configured to extend out from a slit 11 and engage an object 8. In some embodiments, the engagement section 210 is configured to extend out from an upper part of the pin body 1. The engagement section 210 is biased out of the pin body 1 and capable of being actuated toward the pin body 1. The engagement section 210 acts as a spring to apply pressure to an object 8. The tolerances T1 and T2 can be determined by the distance the engagement section 210 extends from the body and/or the spring constant of the engagement section 210. In some embodiments, the mid-alignment section 212 and/or the lower abutment 213 are sized such that they are flush with the pin body 1 such that they can abut the hole surface when inserted into the working surface hole 71. In some embodiments, the engagement section 210 and the lower abutment 213 are coupled to each other about an arm 20, and when the engagement section 210 is pressed/rotated, force is transmitted about the arm 20 to rotate the lower abutment 213. When the positioning member 100 is located in a working surface hole 71, in some embodiments, the lower abutment 213 will resist movement when the lower abutment 213 abuts the working surface hole 71. In some embodiments, the amount of movement of the lower abutment 213 can be predetermined as a means to adjust the force and/or tolerance for the positioning member 100.

In some embodiments, the retaining element 22 comprises one or more retaining elements 220. In some embodiments, the retaining elements 220 comprise an upper retaining element 221 and/or a lower retaining element 222. In some embodiments, the retaining elements 220 are configured to reside in a retaining orifice 121. The retaining elements 220 help secure the biasing element 2 in the pin body 1, help prevent rotation if the biasing element 2 in relation to the pin body 1, or a combination thereof. In some embodiments, the upper retaining element 221 and the lower retaining element 222 are coupled to each other about an arm 20. When the biasing element 2 is inserted into the pin body 1, the lower retaining element 222 is able to rotate about the arm 20 and rebound once located in the lower retaining orifice 121. While being inserted, the upper retaining element arm 2210 may rotate outward but will be able to be inserted because of the upper retaining orifice 121. In some embodiments, the retaining member 12 is located between the upper retaining element 221 and the lower retaining element 222. In some embodiments, the upper retaining element arm 2210 and the lower retaining element arm 2211 abut the retaining member 12. In some embodiments, the retaining elements 220 are retained by slit walls 111 and their abutment of the retainer ledges 123.

In some embodiments, there are two arms 20. A first arm 20 extends from the engagement section 210 to the lower retaining element 222, and a second am 20 extends from the lower abutment 213 to the upper retaining element 221.

In some embodiments with two retaining orifices 121, the two retaining orifices 121 are aligned, and in some embodiments, the two retaining orifices 121 are offset. In some embodiments, the upper retaining element 221 and the lower retaining element 222 are aligned, and in some embodiments, the upper retaining element 221 and the lower retaining element 222 are offset.

Figure 5:
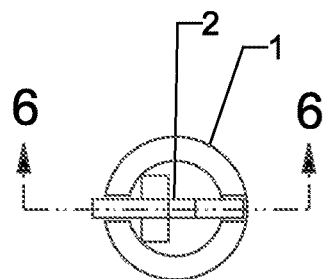
FIG. 5 shows a top view of an embodiment of a positioning member.

FIG. 5 shows an embodiment of a positioning member 100, as seen from the top. As can be seen, the restraining sections 211 will prevent unwanted movement of the biasing element 2 out of the pin body 1. The restraining sections 211 can be predetermined as to allow for the desired movement. In some embodiments, the restraining sections 211 will abut the inside of the pin body 1. It can also be seen that the engagement element 21 protrudes from inside the pin body 1 through the slit 11 and outside the pin body 1.

Figure 6:
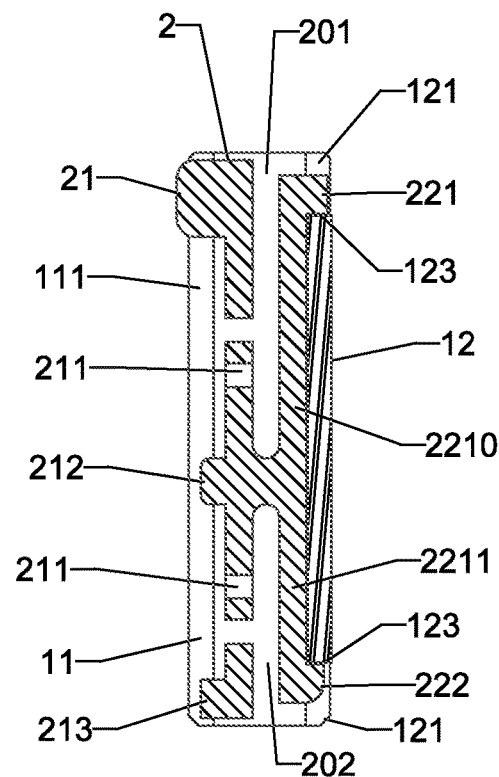
FIG. 6 shows a cross-section of the embodiment shown in FIG. 5.

FIG. 6 shows a cross-section of an embodiment of a positioning member 100. In some embodiments, the mid-alignment section 212 and/or lower abutment 213 are located at least partially inside the slit 11. The mid-alignment section 212 and/or the lower abutment 213 will help prevent rotation of the biasing element 2 about the axis of the pin body 1 by abutting the slit walls 111. In some embodiments, the upper retaining element 221 and/or the lower retaining element 222, when located inside a retaining orifice 121, can help prevent rotation of the biasing element 2 about the axis of the pin body 1.

FIG. 7 illustrates an embodiment of a pin body 1 and a biasing element 2.

In some embodiments, the biasing element 2 is made from sheet/plate material that is then manipulated to provide for one or more restraining sections 211. In some embodiments, the biasing element 2 is formed of a wire, cable, or other linear element bent and shaped to the desired biasing element 2 shape. In some embodiments, the biasing element 2 is formed of piano wire.

FIG. 8 shows an embodiment of a positioning member 100, as seen from the top. As can be seen, the restraining sections 211 will prevent unwanted movement of the biasing element 2 out of the pin body 1. The restraining sections 211 can be predetermined as to allow for the desired movement. In some embodiments, the restraining sections 211 will abut the inside of the pin body 1. It can also be seen that the engagement element 21 protrudes from inside the pin body 1, through the slit 11, and outside the pin body 1.

FIG. 9 shows a cross-section of an embodiment of a positioning member 100. In some embodiments, the lower abutment 213 is located at least partially inside the slit 11. The lower abutment 213 will help prevent rotation of the biasing element 2 about the axis of the pin body 1. In some embodiments, the upper retaining element 221 and/or the lower retaining element 222, when located inside a retaining orifice 121, can help prevent rotation of the biasing element 2 about the axis of the pin body 1.

The embodiments shown and described above are only examples. Even though numerous characteristics and advantages of the present technology have been set forth in the foregoing description, together with details of the structure and function of the present disclosure, the disclosure is illustrative only, and changes may be made in the detail, including in matters of shape, size and arrangement of the parts within the principles of the present disclosure up to, and including, the full extent established by the broad general meaning of the terms used in the claims.

It should also be noted that elements of embodiments may be described in reference to the description of a particular embodiment; however it is disclosed that elements of disclosed embodiments can be switched with corresponding elements of embodiments with the same name and/or number of other disclosed embodiments.

Depending on the embodiment, certain steps of methods described may be removed, others may be added, and the sequence of steps may be altered. It is also to be understood that the description and the claims drawn to a method may include some indication in reference to certain steps. However, the indication used is only to be viewed for identification purposes and not as a suggestion as to an order for the steps.

What is claimed is:

1. An apparatus comprising:
    a positioning member comprising:
        a pin body comprising two slit walls and a retaining member;
        a biasing element located within the pin body, the biasing element comprises an engagement element, a first restraining section, and a retaining element;
        wherein at least a part of the engagement element extends through the two slit walls to outside the pin body; and the retaining element engages the retaining member; the engagement element is biased away from the pin body, and the first restraining section is wider than a distance between the two slit walls.

2. The apparatus of claim 1, wherein the retaining member comprises a retainer ledge, and the retaining element abuts the retainer ledge.

3. The apparatus of claim 1, wherein the retaining element comprises an upper retainer ledge and a lower retainer ledge, the retaining element comprises an upper retaining element and a lower retaining element, and upper retaining element abuts the upper retainer ledge and the lower retaining element abuts the lower retainer ledge.

4. The apparatus of claim 1, wherein the two slit walls define a slit, and the slit runs along an entire longitudinal length of the pin body.

5. The apparatus of claim 1, wherein the engagement element comprises an engagement section and a lower abutment; and the engagement section and the lower abutment are coupled together such that an inward force applied to the engagement section causes the lower abutment to have an outward force, to move outwardly, or both have an outward force and move outwardly.

6. The apparatus of claim 1, wherein the engagement element comprises an engagement section, a mid-alignment section, and a lower abutment; and at least a portion of the engagement section, at least a portion of the mid-alignment section, and at least a portion of the lower abutment are located inside the two slit walls.

7. The apparatus of claim 1, wherein the engagement element comprises an engagement section and a lower abutment, and the engagement section and the lower abutment define a lever about a pivot.

8. An apparatus comprising:
a fixture comprising a working surface, and the working surface defines a first working surface hole;
a positioning member configured to be partially inserted into the first working surface hole; wherein the positioning member comprises:
a pin body comprising two slit walls and a retaining member;
a biasing element located within the pin body, the biasing element comprises an engagement element, a first restraining section, and a retaining element;
wherein at least a part of the engagement element extends through the two slit walls to outside the pin body; and the retaining element engages the retaining member; the first restraining section is wider than a distance between the two slit walls; and the engagement element is biased away from the pin body.

9. The apparatus of claim 8, wherein the retaining member comprises a retainer ledge, and the retaining element abuts the retainer ledge.

10. The apparatus of claim 8, wherein the retaining element comprises an upper retainer ledge and a lower retainer ledge, the retaining element comprises an upper retaining element and a lower retaining element, and upper retaining element abuts the upper retainer ledge and the lower retaining element abuts the lower retainer ledge.

11. The apparatus of claim 8, wherein the biasing element comprises a first restraining section, and the first restraining section is wider than a distance between the two slit walls.

12. The apparatus of claim 8, wherein the two slit walls define a slit, and the slit runs along an entire longitudinal length of the pin body.

13. The apparatus of claim 8, wherein the engagement element comprises an engagement section and a lower abutment; and the engagement section and the lower abutment are coupled together such that an inward force applied to the engagement section causes the lower abutment to have an outward force, to move outwardly, or both have an outward force and move outwardly.

14. The apparatus of claim 8, wherein the engagement element comprises an engagement section, a mid-alignment section, and a lower abutment; and at least a portion of the engagement section, at least a portion of the mid-alignment section, and at least a portion of the lower abutment are located inside the two slit walls.

15. The apparatus of claim 8, wherein the engagement element comprises an engagement section and a lower abutment, and the engagement section and the lower abutment define a lever about a pivot.

16. The apparatus of claim 8, further comprising an object and a locating pin, wherein the positioning member further defines a second working surface hole, and the locating pin is configured to be partially inserted into the second working surface hole; the object is located on the working surface and between the positioning member and the locating pin, and the positioning member biases the object toward the locating pin.

17. The apparatus of claim 16, wherein the engagement element abuts the object.

* * * * *